United States Patent Office 3,254,100
Patented May 31, 1966

3,254,100
HYDROCORTISONE 21-(LOWER ALKANE) SULFONATE
John P. Conbere, West Barrington, R.I., and Karl Pfister III, Westfield, N.J., assignors to Merck & Co., Inc., Rahway, N.J., a corporation of New Jersey
No Drawing. Filed Apr. 17, 1961, Ser. No. 103,189
2 Claims. (Cl. 260—397.45)

This invention relates to steroids and particularly to phosphate derivatives of cortisone and hydrocortisone, to processes for preparing them and to intermediate compounds thus obtained.

This application is a continuation-in-part of co-pending application Serial No. 774,594, filed November 18, 1958, now Patent No. 3,068,223, issued December 11, 1962, which in turn, is a division of application Serial No. 447,912, filed August 4, 1954, now Patent No. 2,870,177, issued January 20, 1959.

Since the discovery of the remarkable properties of cortisone and hydrocortisone for use in the therapy of arthritis and related diseases, there has been a widespread interest in finding other steroids and derivatives of these compounds which not only possess the desirable properties of these hormones, but also possess other desirable properties which would make them more adaptable to a wider range of methods of administration. One of the most desirable properties which has been sought for hormones is water solubility. The advantages of having water soluble forms of cortisone and hydrocortisone are readily apparent. As an example, the facile administration of such hormones dissolved in a water solution allows almost instantaneous utilization of the hormones by the system. When the usual saline suspension of the acetate esters are injected, however, it required from 4 to 24 hours before such utilization occurs. This quick action would allow rapid alleviation of diseases requiring hormone therapy.

One of the primary factors which has hindered the search for water-soluble forms or derivatives of cortisone and hydrocortisone is the particular characteristic of these hormones in that many of their derivatives do not maintain the necessary adrenal activity. This may be demonstrated as for example, in the case of cortisone sulfate which exhibits little or no cortical activity.

A primary object of the present invention is to produce water-soluble derivatives of cortisone and hydrocortisone. A related object is to produce such derivatives without any reduction in cortical activity. A further object is to provide processes for producing these derivatives and intermediates useful in such processes. Other objects and the advantages of the invention will appear hereinafter.

The compounds which are the subject of the invention are phosphate derivatives of steroids having the general formula:

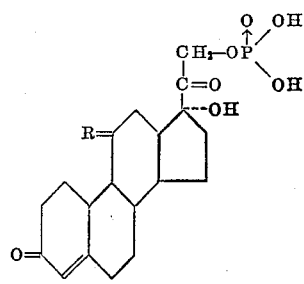

wherein R is an oxygen group (O=) thereby forming an 11-keto steroid or a hydrogen and β-hydroxy group

thereby forming an 11β-hydroxy steroid; and salts thereof. These compounds are soluble in a large range of solvents including water, and also maintain the same high cortical activity as cortisone and hydrocortisone.

The compounds of this invention may be prepared by reacting 3-ethylenedioxy-$\Delta^5$-pregnene - 17α,21-diol-11-R-20-one (Compound I), wherein R is as defined above, with an organic sulfonyl chloride compound to produce the corresponding 3-ethylenedioxy-$\Delta^5$-pregnene-17α,21-diol-11 - R - 20-one 21-sulfonate compound (Compound II). This compound is then treated with an iodide salt to form the corresponding 21-iodo pregnene (Compound III) which when reacted with an organic phosphate forms the corresponding 21-organic phosphate pregnene compound (Compound IV). This latter compound is then hydrogenated in the presence of a hydrogenation catalyst and a tertiary amine to form the corresponding 21-amine salt of 3-ethylenedioxy-$\Delta^5$-pregnene-17α,21-diol-11-R-20-one 21-phosphate (Compound V). This latter compound is hydrolyzed to produce the 21-phosphate of cortisone or hydrocortisone (Compound VI) which may be converted to a phosphate salt (Compound VII) by treating with a basic substance.

As an alternate procedure, the 3-ethylenedioxy-$\Delta^5$-pregnene - 17α,21-diol-11-R-20-keto 21-sulfonate (Compound II) may be prepared by reacting cortisone or hydrocortisone (Compound VIII) with an organic sulfonyl chloride compound to produce the corresponding $\Delta^4$-pregnene-17α,21-diol-11-R-3,20-dione 21-sulfonate compound (Compound IX) which is treated with an ethylenedioxy yielding compound to form the corresponding 3-ethylene-dioxy-$\Delta^5$-pregnene - 17α,21-diol-11-R-20-keto 21-sulfonate compound (Compound II). The $\Delta^4$-pregnene-17α21-diol-11-R-3,20-dione 21-sulfonate compound (Compound IX) may be reacted with an iodide salt to form 21-iodo-$\Delta^4$-pregnene-17α-ol-11-R-3,20-dione (Compound X) which is then treated with an organic phosphate to produce the corresponding 21-organic phosphate derivative (Compound XI). This latter compound is reacted with an ethylenedioxy-yielding compound to produce the corresponding 3-ethylenedioxy-Δ⁵-compound (Compound IV).

These reactions may be chemically represented as follows wherein R is as defined above, $R^2$ is an alkyl group, $R^3$ in an aryl group, $R^4$ is a tertiary amine and Y is a metal group and $n$ is a whole integer varying from 1 to 2:

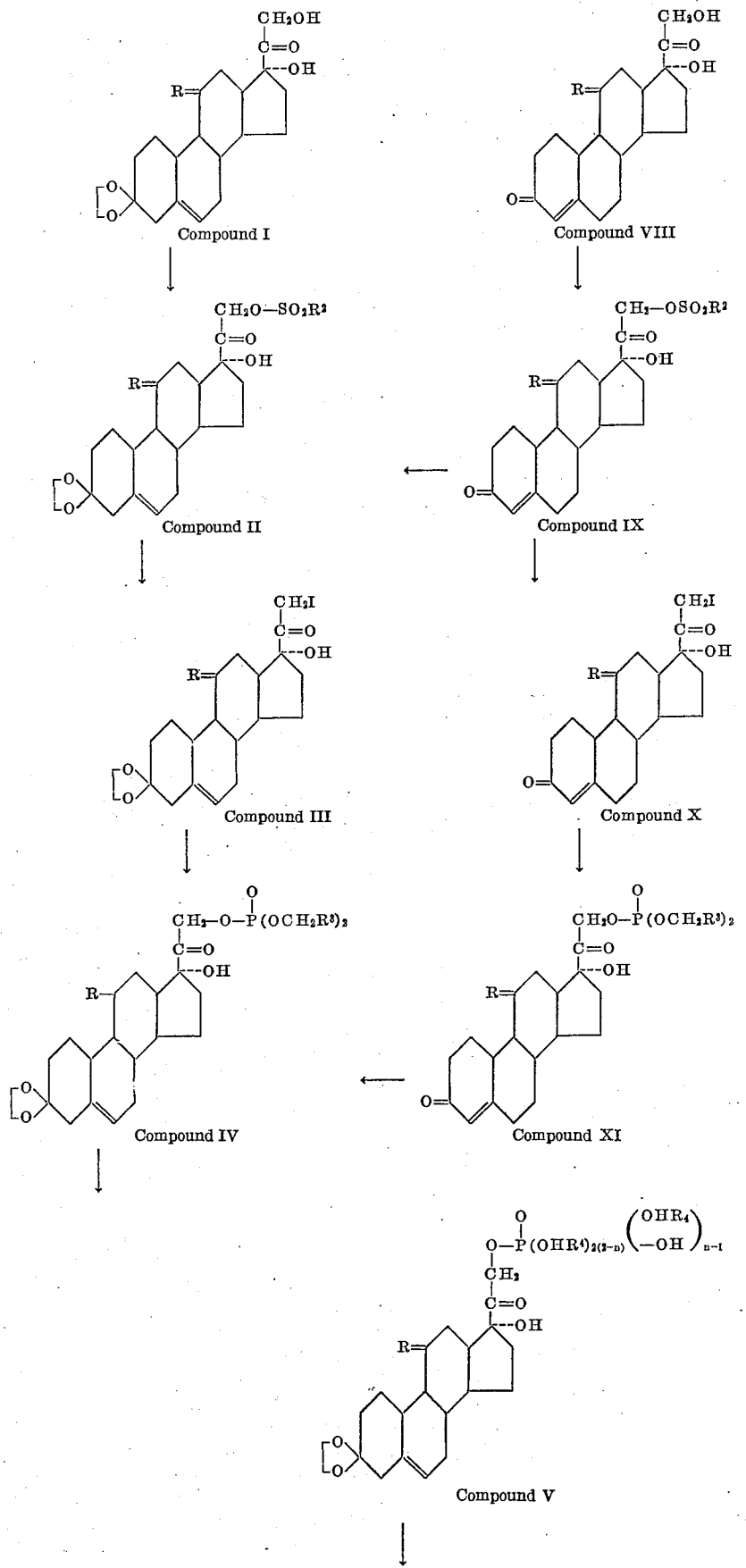

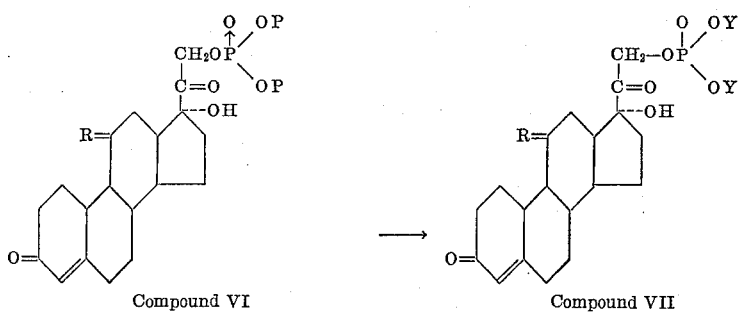

Compound VI → Compound VII

The 3-ethylene-dioxy-Δ⁵-pregnene-17α,21-diol-11-R-20-one, where R is as defined above, is reacted with an organic sulfonyl chloride to produce the corresponding 21-sulfonoxy-pregnene compound. The sulfonyl chloride is of the formula $R^2SO_2Cl$ wherein $R^2$ is an alkyl group preferably having a carbon chain length of from one to six carbon atoms. Typical examples of such groups are methyl, ethyl and propyl. The reaction is preferably carried out in a solvent such as pyridine or other tertiary amines. The reaction is usually complete in about 1 to 3 hours when the temperature is maintained at approximately 0° C. The product is recovered by diluting the reaction mixture with water and recovering the crystalline material. The corresponding 3-keto derivatives of these novel 21-sulfonoxy esters possess hydrocortisone-like activity in that they are useful in the alleviation of inflammatory conditions. In addition they can be used in the preparation of 21-desoxy steroids possessing anti-inflammatory activity. Thus, for example, 21-desoxy hydrocortisone may conveniently be prepared by reacting hydrocortisone 21-methanesulfonate with sodium iodide to form the corresponding 21-iodo compound, and reacting this compound with zinc to produce 21-desoxy hydrocortisone.

The 21-sulfonyl derivative of the 3-ethylene-dioxy-Δ⁵-pregnene-17α,21-diol-11-R-20-one is converted to the corresponding 21-iodo compound by treating with an iodide salt. The reaction is conveniently effected by contacting the reactants in a solvent such as an alcohol, ketone or ether. Typical examples of suitable solvents are methanol, ethanol, propanol, methyl butyl ether, ethyl ether, acetone and methyl ethyl ketone. The reaction is preferably carried out at a temperature of approximately 25° to 100° C. and is usually complete in ½ to 2 hours. The product may be separated from the reaction mixture by the addition of a non-solvent such as water.

The 3-ethylenedioxy-21-iodo-Δ⁵-pregnene-17α-ol-11-R-20-one is converted to the corresponding 21-organic phosphate compound by treating with an organic phosphate. The organic phosphate is of the formula $$(R^3-CH_2O)_2PO(OH)$$

wherein $R^3$ is an aryl group having a six carbon ring. Examples of such groups are phenyl and substituted phenyls. The organic phosphate is preferably used in the form of a salt such as the silver, sodium, potassium, barium or calcium salt or other metal salts which form insoluble iodides. The reaction is conveniently carried out in the solvent for the reactants such as benzene, toluene, xylene or dioxane and at the reflux temperature of the solvent. The reaction usually requires from 4 to 26 hours for completion. The product may be recovered by the addition of a non-solvent such as an ether.

The 21-organic phosphate compound of 3-ethylenedioxy-Δ⁵-pregnene-17α,21-diol-11-R-20-one is converted to a 21-tertiary amine salt of the 21-phosphate compound by treating with a tertiary amine ($R^4$) and hydrogenating in the presence of a hydrogenation catalyst. Suitable tertiary amines are N-methyl piperidine, dimethylaniline, diethylaniline and trimethylamine. The hydrogenation catalyst may be any of the conventional catalysts such as platinum, nickel or palladium and oxides of these metals. The catalyst may be supported on a suitable carrier such as barium sulfate, calcium carbonate, barium carbonate and the like. The reaction is preferably carried out in a solvent such as an alcohol as for example ethanol, methanol or propanol. The reaction is carried out at approximately 0° to 100° C., preferably at room temperature, until two moles of hydrogen are taken up. The product is separated from the reaction mixture by any of the conventional means such as diluting with water, removing the impurities by extracting with a solvent and concentrating the water solution of dryness.

The 3-ethylenedioxy group of the 21-amine salt is hydrolyzed to form the 21-phosphate of cortisone or hydrocortisone. The hydrolysis may be carried out by treating with a strong acid in a suitable solvent such as acetone, methanol, ethanol, benzene or toluene. Strong acids such as hydrochloric acid, sulfuric acid, perchloric acid and p-toluene sulfonic acid, using dilute concentrations, are effective for the hydrolysis. The reaction may be carried out from about 20 to 100° C. but is conveniently effected at the reflux temperature. The reaction is ordinarily complete in from several minutes to 1 hour. A preferred procedure for the hydrolysis is to contact a solvent solution of the 21-amine salt with an anion exchange resin on the hydrogen cycle. Suitable resins are those shown in U.S. Patents 2,597,494; 2,597,440; 2,570,822; 2,567,836 and 2,543,666. Trade names of specific resins are Amberlite IR–105, Amberlite IR–120 and Amberlite IR–100 (produced by Rohm & Haas Co.).

The phosphate derivatives of cortisone and hydrocortisone may also be prepared directly from cortisone and hydrocortisone by reacting with an organic sulfonyl chloride compound to produce the corresponding Δ⁴-pregnene-17α,21-diol-11-R-3,20-dione 21-sulfonate compound. The sulfonyl chloride is of the formula $R^2SO_2Cl$ wherein $R^2$ is as defined above. The reaction is preferably carried out in a solvent such as pyridine, benzene, toluene, tetrahydrofuran or dioxane. The reaction is carried out most effectively at approximately 0° C. and at this temperature the reaction is complete in 1 to 3 hours. The product is recovered by diluting the reaction mixture with water and recovering the crystalline material.

The Δ⁴-pregnene-17α,21-diol-11-R-3,20-dione 21-sulfonate compound may then be converted to the corresponding 3-ethylenedioxy derivatives. This reaction is conveniently achieved by reacting with ethylene glycol in the presence of an acid catalyst or by an exchange reaction with an ethylenedioxy yielding compound such as an ethylenedioxy derivative of a lower aliphatic ketone such as acetone, methyl ethyl ketone, mesityl oxide and the like. If desired, this reaction may be effected in an inert solvent such as benzene, toluene, xylene, tetrahydrofuran or dioxane. The reaction proceeds rapidly at an elevated temperature, as for example, at the reflux temperature in from 1 to 5 hours. Ordinarily a small amount of a strong acid such as p-toluene sulfonic acid or sulfuric acid is added to enhance the rate of the reaction. Following the completion of the reaction the acid is neutralized with a base, the mixture is diluted with water and the desired product is extracted from the mixture with an immiscible solvent. The product may be isolated by removing the solvent by evaporation under reduced pressure.

The $\Delta^4$-pregnene-17α,21-diol-11-R-3,20-dione 21-sulfonate compound may be converted to the corresponding 21-iodo-compound by reacting with a suitable iodide salt. Ordinarily it is preferred to effect the reaction with an alkali metal salt such as sodium iodide in a solvent such as acetone or an alcohol. The reaction proceeds at ordinary temperature in usually less than one hour. The product may be recovered by adding water to the mixture, extracting the product and evaporating the solvent.

The 21-iodo-$\Delta^4$-pregnene-17α-ol-11-R-3,20-dione may be reacted with an organic phosphate to from the corresponding 21-organic phosphate compound. The organic phosphate is of the formula $(R^3CH_2O)_2PO)OH)$ wherein $R^3$ is as defined above. The phosphate is usually used in the form of a salt as for example, the silver salt or other metal salts which form insoluble iodides. The reaction is preferably carried out in a solvent such as benzene, toluene, tetrahydrofuran or dioxane. The reaction proceeds favorably at the reflux temperature of the solvent. The reaction usually requires from 4 to 20 hours for completion. The product may be precipitated by the addition of a non-polar solvent such as petroleum ether.

The 21-phosphate derivative of the $\Delta^4$-pregnene-17α-21-diol-11-R-3,20-dione may then be converted to the corresponding $\Delta^5$-3-ethylenedioxy compound. This reaction is conveniently achieved by reaction with ethylene glycol in the presence of an acid catalyst or by an exchange reaction with an ethylenedioxy yielding compound such as an ethylenedioxy derivative of a lower aliphatic ketone such as acetone, methyl ethyl ketone, mesityl oxide and the like. If desired, this reaction may be effected in an inert solvent such as benzene, toluene, tetrahydrofuran or dioxane. The reaction proceeds rapidly at elevated temperatures. As for example, at the reflux temperature the reaction is complete in 1 to 5 hours. Ordinarily a small amount of strong acid such as p-toluene sulfonic acid or sulfuric acid is added to enhance the rate of reaction. Following completion of the reaction the acid is neutralized with a base, the mixture is diluted with water and the desired product is extracted from the mixture with an immiscible solvent. The product may be isolated by removing the solvent by evaporation under reduced pressure.

The salts of the 21-phosphate derivative of cortisone and hydrocortisone may be prepared by reacting the compound with an aqueous solution of alkali or alkaline earth bases or salts such as hydroxides, carbonates, bicarbonates or acetates. The product may be recovered by the addition of a non-solvent to precipitate the salt. Typical examples of salts which may be formed are sodium, calcium, potassium, magnesium, barium, ammonium and the like. By controlling the amount of reactants both the mono and di salts may be formed.

Table I demonstrates the activity of the 21-phosphates. The data is the result of one day liver gylcogen tests in mice by oral administration.

TABLE I

| Substance | Dose (γ/10 gm. mouse) | Liver Glycogen (mg./10 gm. mouse± Standard Error) |
| --- | --- | --- |
| None | | 6.1±0.39 |
| Cortisone Acetate | 20 | 8.6±0.52 |
| Sodium Cortisone Phosphate | 20 | 8.1±0.74 |

Table II shows the results obtained from groups of 8 mice receiving 5 hourly doses of the phosphate or free alcohol, subcutaneously or orally. The total dose was 40γ of cortisone alcohol per 10 gm. weight of the mouse, or its molecular equivalent of the phosphate.

TABLE II

| Substance | Route | Liver Glycogen (mg./10 gm. mouse± s.c.) |
| --- | --- | --- |
| None | oral | 4.3±0.15 |
| Cortisone Alcohol | oral | 9.4±0.56 |
| Cortisone Phosphate | oral | 9.8±0.74 |
| Cortisone Alcohol | s.c. | 11.7±0.44 |
| Cortisone Phosphate | s.c. | 10.5±0.63 |

The following examples illustrate methods of carrying out the present invention, but it is to be understood that these examples are given for purposes of illustration and not limitation.

*Example I.—3-ethylenedioxy-$\Delta^5$-pregnene-17α,21-diol-11,20-dione*

A 4.72 g. sample of 3-ethylenedioxy-$\Delta^5$-pregnene-17α,21-diol-11,20-dione 21-acetate is suspended in 260 ml. of methanol and the reaction mixture purged four times with nitrogen. Sodium methoxide (0.675 g.) is added and the stirred suspension heated to 60° C. under nitrogen. After five to seven minutes the solution is clear. The heating is continued for an additional five minutes and the reaction mixture cooled to 15° C. Glacial acetic acid (0.84 ml.) and 100 ml. of water are then added and the reaction mixture concentrated under vacuum to 250 ml. An additional 100 ml. of water is added and the concentration continued to a volume of 200 ml. The slurry is cooled and the solid collected and dried to yield 4.0 g. of product, M.P. 178–185° C. Recrystallization from ethyl acetate-petroleum ether gives 2.6 g., M.P. 198–200° C. Ultraviolet absorption spectra shows E percent 4.4 at 2920A. Calcd. for $C_{23}H_{32}O_6$ (404.49): C, 68.29; H, 7.97. Found: C, 68.03; H, 8.26.

*Example II.—3-ethylenedioxy-$\Delta^5$-pregnene-17α,21-diol-11,20-dione 21-methane sulfonate*

A 1.0 g. sample of 3-ethylenedioxy-$\Delta^5$-pregnene-17α,21-diol-11,20-dione in 8 ml. of pyridine is cooled to 0° C. and treated with 4 ml. of methanesulfonyl chloride. After standing for two and one-half hours at 0° C., the reaction mixture is poured into 150 ml. of cold water and aged in an ice bath. The crystals are collected and washed with water. The solid is triturated with methanol and ether to give 850 mg. of solid, M.P. 180–182° C. dec. Recrystallization from acetonitrile-ether yields 570 mg., M.P. 201–202° C. The material has no absorption at 2380 A. Calcd. for $C_{24}H_{34}O_8S$: C, 59.73; H, 7.10; S, 6.64. Found: C, 59.85; H, 6.89; S, 6.75.

*Example III.—$\Delta^4$-pregnene-17α,21-diol-3,11,20-trione 21-methane sulfonate*

Cortisone (6.0 g.) is dissolved in 40 ml. of pyridine, cooled to 0° C., and treated wtih 1.6 ml. of methane sulfonyl chloride. After standing for one-half hour at 0° C. the reaction mixture is poured into 400 ml. of water and the aqueous suspension aged in an ice bath. The crystals are collected, washed with water and dried to give 6.6 g. of product, M.P. 122–124° C. Recrystallization from methanol yields either of two dimorphic forms; M.P. 124–125° C. or M.P. 195–196° C. dec. Calcd. for $C_{22}H_{30}O_7S$: C, 60.25; H, 6.90; S, 7.31. Found: C, 60.25; H, 7.09; S, 7.61.

*Example IV.—3-ethylenedioxy-$\Delta^5$-pregnene-17α,21-diol-11,20-dione 21-methane sulfonate*

A 1.0 g. sample of $\Delta^4$-pregnene-17α,21-diol-3,11,20-trione 21-methane sulfonate, 50 mg. of p-toluenesulfonic acid hydrate, 10 ml. of the dioxolane of mesityl oxide and 50 ml. of benzene are refluxed for four hours. The reaction mixture is cooled, washed with sodium bicarbonate solution and then with water. After drying over magnesium sulfate the solution is concentrated to a syrup and taken up in ethyl acetate. The slow addition of petroleum ether precipitates crystals, M.P. 168–175° C. Recrystallization from ethyl acetate yields 150 mg. of substantially pure 3-ethylenedioxy-$\Delta^5$-pregnene-17α,21-diol-11,20-dione 21-methane sulfonate.

*Example V.—3-ethylenedioxy-21-iodo-$\Delta^5$-pregnene-17α-ol-11,20-dione*

A 570 mg. sample of 3-ethylenedioxy-$\Delta^5$-pregnene-17α,21-diol-11,20-dione 21-methane sulfonate, 280 mg. of sodium iodide and 35 ml. of ethanol are refluxed for one-half an hour. The mixture is filtered and the filtrate concentrated to 25 ml. Water (30 ml.) is added and the mixture concentrated to 50 ml. The solid is collected, washed with water and dried to give 510 mg. of product, dec. 123° C. Calcd. for $C_{23}H_{31}IO_5$: C, 53.70; H, 6.08. Found: C, 53.81; H, 5.80.

*Example VI.—3-ethylenedioxy-$\Delta^5$-pregnene-17α,21-diol-11,20-dione 21-dibenzylphosphate*

A suspension of 3.63 gm. of 3-ethylenedioxy-21-iodo-$\Delta^5$-pregnene-17α-ol-11,20-dione and 3.2 gm. of silver dibenzylphosphate in 534 ml. of benzene was concentrated at atmospheric pressure to a volume of approximately 321 ml. (213 ml. of benzene distilled). The resultant slurry was refluxed for 20 hours, with protection from moisture. The mixture was filtered while hot and evaporated in vacuo to a volume of 50 ml., and filtered again. By keeping the solution hot while adding (heptane) Skellysolve B, crystals of 3-ethylenedioxy-$\Delta^5$-pregnene-17α,21-diol-11,20-dione 21-dibenzylphosphate formed. If the mixture was allowed to cool before complete crystallization had occurred the gelatinous form of the product would appear in the supernatant. Reheating and keeping hot during the crystallization period afforded all crystalline material. The crystals were collected, washed with ethyl ether and air dried. The product, 3-ethylenedioxy-$\Delta^5$-pregnene-17α,21-diol-11,20-dione 21-dibenzylphosphate, was redissolved and treated with Darco G-60, reprecipitation of the product as above resulted in 1.98 gm. of crystalline material, M.P. 150–151.5° C. Calcd. for $C_{37}H_{45}O_9P$: C, 66.85; H, 6.82; P, 4.66. Found: C, 67.00; H, 6.64; P, 4.56.

*Example VII.—21-iodo-$\Delta^4$-pregnene-17α-ol-3,11,20-trione*

A 500 mg. sample of $\Delta^4$-pregnene-17α,21-diol-3,11,20-trione 21-methane sulfonate in 30 ml. of acetone is treated with 220 mg. of sodium iodide. After refluxing for 10 minutes, the mixture is filtered and the filtrate concentrated to 20 ml. Water (50 ml.) is added, the mixture cooled and the crystals collected and washed with water and dried to give 420 mg. of product; dec. 160–175° C. Recrystallization from acetone-petroleum ether gives crystals dec. 170–175° C. Calcd.: I, 26.98. Found: I, 26.72.

*Example VIII.—$\Delta^4$-pregnene-17α,21-diol-3,11,20-trione 21-dibenzylphosphate*

A 1.6 g. sample of 21-iodo-$\Delta^4$-pregnene-17α-ol-3,11,20-trione and 1.45 g. of silver dibenzylphosphate are suspended in 150 ml. of benzene and 25 ml. of solvent distilled therefrom to dry the system. The mixture is refluxed for sixteen hours and filtered while hot. The residue is washed with warm benzene and the combined filtrates concentrated to a syrup which crystallizes. The syrup is crystallized from benzene-petroleum ether mixture to give 1.9 g. of product, M.P. 147–149° C. A portion recrystallized from acetone-petroleum ether, M.P. 160–162° C. Calcd. for $C_{35}H_{41}O_8P$: P, 4.99. Found: P, 4.68.

*Example IX.—3-ethylenedioxy-$\Delta^5$-pregene-17α,21-diol-11-20-dione 21-dibenzylphosphate*

A 1.0 g. sample of $\Delta^4$-pregnene-17α,21-diol-3,11,20-trione 21-dibenzylphosphate, 0.1 g. of p-toluenesulfonic acid monohydrate, 3.5 ml. of the dioxolane of mesityl oxide and 100 ml. of benzene are refluxed for 6 hours and the water collected in a Dean-Stark trap. The solution is cooled, washed with aqueous sodium bicarbonate, and water, and then dried over magnesium sulfate. The organic layer is concentrated to a syrup which is crystallized from benzene-petroleum ether to give crystals M.P. 75–83° C. Chromatographic separation over "florisil," yields a crystalline crop, M.P. 65–75° C. which is a different modification of the compound formed in Example VI.

*Example X.—$\Delta^4$-pregnene-17α,21-diol-3,11,20-trione 21-phosphate*

1.0 g. of 3-ethylenedioxy-$\Delta^5$-pregnene-17α,21-diol-11,20-dione 21-dibenzylphosphate is dissolved in 100 ml. of ethanol containing 4 ml. of N-methylmorpholine and hydrogenated at room temperature and atmospheric pressure in the presence of 1.0 g. of palladium oxide which has been prereduced. The reaction mixture is filtered and concentrated in vacuo to a syrup. The syrup is dissolved in water and extracted with ethyl acetate and then ether. The aqueous layer is concentrated to dryness to give 820 mg. of solid N-methylmorpholine salt of 3-ethylenedioxy-$\Delta^5$-pregnene-17α,21-diol-11,20-dione 21-phosphate. A 360 mg. sample of this solid in 20 ml. of methanol is shaken overnight with 640 mg. of methanol dried Amberlite IR-120 (ion exchange resin) on the hydrogen cycle.

The resin is removed and the supernatant layer contained cortisone phosphate which is separated from the methanol.

*Example XI.—Sodium Salt of $\Delta^4$-pregnene-17α,21, diol-3,11,20-trione 21-phosphate*

The cortisone phosphate is treated with 45 mg. of sodium bicarbonate in 2 ml. of water. The whole is concentrated to dryness and the residue taken up in water and shaken out with ethyl acetate. The aqueous layer is concentrated to dryness, dissolved in methanol and 1:1 absolute ether-ethanol added to precipitate sodium cortisone phosphate. λ max. 238, E percent 290, $[\alpha]_D^{25}$ +145° (c.=1, methanol).

*Example XII.—$\Delta^4$-pregnene-11β,17α,21-triol-3,20-dione 21-phosphate*

The compound $\Delta^4$-pregnene-11β,17α,21-triol-3,20-dione 21-phosphate is prepared by the procedure of Examples I to X by using 3-ethylenedioxy-$\Delta^5$-pregnene-11β,17α,21-triol-20-one and $\Delta^4$-pregnene-11β,17α,21-triol-3,20-dione respectively, as the starting material in Examples I and III.

*Example XIII.—Potassium salt of $\Delta^4$-pregnene-17α, 21-diol-3,11,20-trione 21-phosphate*

A methanol solution of $\Delta^4$-pregnene-17α,21-diol-3,11,20-trione 21-phosphate is treated with two equivalents of potassium bicarbonate in the same manner as described for the sodium salt in Example XI. The mono-salt is prepared by treating with one equivalent of potassium bicarbonate.

*Example XIV.—Ammonium salt of $\Delta^4$-pregene 17α,21-diol-3,11,20-trione 21-phosphate*

A solution of $\Delta^4$-pregnene-17α,21-diol-3,11,20-trione 21-phosphate is treated with two equivalents of dilute ammonium hydroxide solution to form the diammonium salt. The mono-salt is prepared by treating with one equivalent of ammonium hydroxide. The product was separated as in Example XI.

Example XV.—Sodium salt of Δ⁴-pregnene-11β,17α,21-triol-3,20-dione 21-phosphate A solution of Δ⁴-pregnene-11β,17α,21-triol-3,20-dione 21-phosphate is treated with two equivalents of sodium bicarbonate. The mono-sodium salt is prepared by treating with one equivalent of bicarbonate. The product is separated as in Example XI.

Example XVI.—Potassium salt of Δ⁴-pregnene-11β,17α,21-triol-3,20-dione 21-phosphate A solution of Δ⁴-pregnene-11β,17α,21-triol-3,20-dione 21-phosphate is treated with two equivalents of potassium bicarbonate to form the dipotassium salt. The mono-potassium salt is prepared by treating with one equivalent of potassium bicarbonate. The product is separated as in Example XI.

Example XVII.—3-ethylenedioxy-Δ⁵-pregnene-17α,21-diol-11,20-dione

A suspension of 4.72 g. (10.6 millimoles) of 3-ethylenedioxy-Δ⁵-pregnene-17α,21-diol-11,20-dione 21-acetate in 200 ml. of methanol (prepared by distilling over sodium hydroxide or directly over magnesium methoxide) is purged four times with nitrogen. The flow of nitrogen is maintained, the suspension is heated to 60° C. with stirring, and 0.675 g. (12.5 millimoles) of solid sodium methoxide is added all at once. The nitrogen flow, heating, and stirring are continued until the solution is homogeneous (5 to 7 minutes), whereupon the heat is removed and the mixture was rapidly cooled 10–15° C. The solution is acidified with 0.85 ml. of glacial acetic acid (13.5 millimoles), diluted with 100 ml. of water, and concentrated in vacuo to 200 ml. An additional 100 ml. of water is added, and the concentration is continued to a final volume of 150 ml. The resulting slurry is cooled in ice, and the solid is collected, washed with water, and dried in air. Recrystallization from ethyl acetate yields substantially pure 3-ethylenedioxy-Δ⁵-pregnene-17α,21-diol-11,20-dione, M.P. 198–200° C.

Example XVIII.—3-ethylenedioxy-Δ⁵-pregnene-17α,21-diol-11,20-dione 21-methanesulfonate A solution of 24.5 g. (0.06 mole) of 3-ethylenedioxy-Δ⁵-pregnene-17α,21-diol-11,20-dione in 200 ml. of dry pyridine is cooled to 0° C. and treated with 7.5 ml. (0.1 mole) of methanesulfonyl chloride. After standing 2½ hours at 0° C., the reaction mixture is poured into 8.5 liters of cold water and aged for a half-hour in an ice bath. The crystals are collected and washed with water, methanol and finally, ether. Recrystallization from acetonitrile-ether yields 21 g. of 3-ethylenedioxy-Δ⁵-pregnene-17α,21-diol-11,20-dione 21-methanesulfonate, M.P. 201–202° C.

Example XIX.—3-ethylenedioxy-21-iodo-Δ⁵-pregnene-17α-ol-11,20-dione

A suspension of 13.5 g. of 3-ethylenedioxy-Δ⁵-pregnene-17α,21-diol-11,20-dione 21-methanesulfonate and 6.7 g. of sodium iodide in 830 ml. of ethanol is boiled for a half-hour under reflux. The mixture is filtered while hot, then evaporated in vacuo to about 450 ml. It is then diluted with a liter of water, and further evaporated to about one liter final volume. The resultant slurry is cooled to 0° C., and the crystals are collected, washed with water, and air dried. Yield, 13.5 g. of 3-ethylenedioxy-21-iodo-Δ⁵-pregnene-17α-ol-11,20-dione, dec. 123° C.

Example XX.—3-ethylenedioxy-Δ⁵-pregnene-17α,21-diol-11,20-dione 21-dibenzylphosphate A suspension of 13.5 g. of 3-ethylenedioxy-21-iodo-Δ⁵-pregnene-17α-ol-11,20-dione and 12 g. of silver dibenzyl phosphate [prepared as described in Sheehan, J. Am. Chem. Soc., 72, 1312 (1950)] in 2 liters of benzene is evaporated (atmospheric pressure) to 1.2 liters volume, and then boiled under reflux for 20 hours, with protection from moisture. The mixture is filtered while hot, evaporated to 200 ml., filtered again, and then diluted with petroleum ether to a slight turbidity. The mixture is cooled to 0° C., and the crystals of 3-ethylenedioxy-Δ⁵-pregnene-17α,21-diol-11,20-dione 21-dibenzylphosphate which precipitated are collected, washed well with ether, and air dried. Yield: 13.4 g., M.P. 70–75° C.

Example XXI.—3-ethylenedioxy-Δ⁵-pregnene-17α,21-diol-11,20-dione 21-phosphate,N-methylmorpholine salt A suspension of 5.0 g. of palladium oxide (PdO) in 500 ml. of absolute ethanol and 10 ml. of N-methylmorpholine is reduced tat 40 p.s.i. until no more hydrogen was taken up. The 5.0 g. of *solid* 3-ethylenedioxy-Δ⁵-pregnene-17α,21-diol-11,20-dione 21-dibenzylphosphate is added and the reduction is continued until two additional equivalents of hydrogen are absorbed. The reduction is stopped, the catalyst is filtered off, and the resulting solution is evaporated in vacuo to about 40 ml. The mixture, containing some crystalline material, is cooled to 0° C., and the crystalline 3-ethylenedioxy-Δ⁵-pregnene-17α,21-diol-11,20-dione 21-phosphate, N-methylmorpholine salt is collected, washed with ethanol, then with ether, and air dried. Yield: 3.3 g., M.P. 195–210° C.

Example XXII.—Sodium salt of cortisone 21-phosphate

Ten grams of 3-ethylenedioxy-Δ⁵-pregnene-17α,21-diol-11,20-dione 21-phosphate, N-methylmorpholine salt are dissolved in 500 ml. of methanol and 20. g. of Amberlite IRC–120 (hydrogen cycle) is added. The mixture is shaken overnight (16–20 hours) and then the resin is removed. The solution containing cortisone phosphate is treated with 2.5 g. of sodium bicarbonate (2 equivalents) in 5 ml. water and then evaporated to 5 ml. at 25° C. The residue is taken up in 100 ml. of water; this aqueous solution is extracted with ethyl acetate and ether, and then lyophilized. The resultant solid is taken up in 100 ml. of methanol, the solution is filtered, and the amorphous sodium salt of cortisone phosphate, is precipitated with 200 ml. of ether. This material is collected, washed with ether and petroleum ether, and then dried in air. Yield: 6.0 g., max. 238, F percent 290, $[\alpha]_D^{25}$ +145° (c.=1, methanol).

Various changes and modifications may be made in carrying out the present invention without departing from the spirit and scope thereof. Insofar as these changes and modifications are within the scope of the appended claims, they are to be considered as part of this invention.

We claim:
1. Hydrocortisone 21-mesylate.
2. Hydrocortisone 21-(lower alkane) sulfonate.

References Cited by the Examiner

UNITED STATES PATENTS

| | | | |
|---|---|---|---|
| 2,842,568 | 7/1958 | Herz et al. | 260—397.45 |
| 3,068,223 | 11/1962 | Conbere et al. | 260—239.55 |

LEWIS GOTTS, *Primary Examiner.*

L. H. GASTON, *Examiner.*